Nov. 4, 1958    J. R. SIBLEY    2,858,897
WHEEL DRIVING AND STEERING UNIT
Filed April 13, 1956    2 Sheets-Sheet 1

INVENTOR:
JOHN R. SIBLEY
BY
ATTORNEY

Nov. 4, 1958

J. R. SIBLEY 2,858,897

WHEEL DRIVING AND STEERING UNIT

Filed April 13, 1956

INVENTOR:
JOHN R. SIBLEY
BY
*Terrell S. Ruhlman*
ATTORNEY

United States Patent Office 2,858,897
Patented Nov. 4, 1958

2,858,897

WHEEL DRIVING AND STEERING UNIT

John R. Sibley, Franklin, Pa., assignor to Joy Manufacturing Company, Pittsburgh, Pa., a corporation of Pennsylvania Application April 13, 1956, Serial No. 578,073

5 Claims. (Cl. 180—48)

This invention relates to wheel assemblies and more particularly to wheel assemblies more especially suited for shuttle cars and like vehicles.

Shuttle cars and similar vehicles which are used in underground mining for transporting coal, ore and the like and which carry heavy loads must not only be of a rugged overall construction but also be provided with wheel drive assemblies which are sturdy in construction. The provision of an improved wheel drive assembly which meets this requirement is a primary object of the present invention. Another object is to provide an improved steering as well as driving mechanism for a vehicle wheel.

Wheel assemblies for this general type vehicle which include planetary drives for the wheels have heretofore been designed; however, I have found that several advantages can be realized from designing and constructing a wheel drive unit in which the spindle bearings are supported within, rather than outside, the ring gear member, in which the wheel hub is integral with a planetary gear cage and a spindle, and in which the ring gear and kingpin or pins are integral, all of the above features, so far as I am advised, being new and novel. To mention a few, my new arrangement offers advantages in space utilization by eliminating from the length of the unit the ring gear web thickness and its clearance, thus permitting a better bearing location and a reduction of moment resulting from a shorter wheel supporting lever arm, in transmitting ring gear torque more directly to the support means, in increasing bearing capacity, and in providing a unit which can be more economically produced. Accordingly, it is a more particular object of my invention to provide a new and improved wheel drive and steering unit embracing the structural features from which the above advantages flow.

Other objects and advantages of the present invention will be apparent from the following more detailed description of a preferred embodiment of the invention in which.

Figure 1:
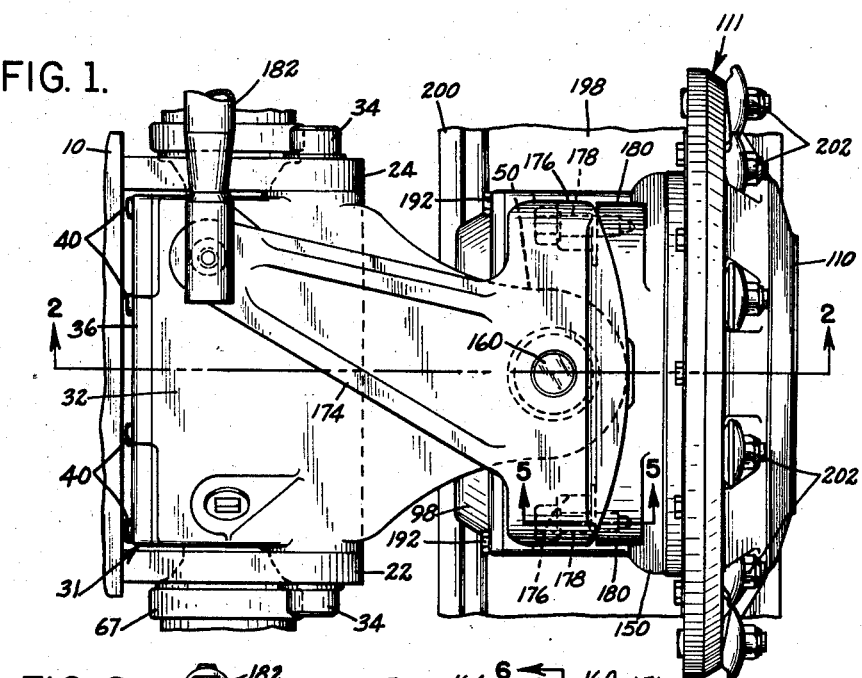
Fig. 1 is a plan view of the improved steering and planetary wheel drive unit of the present invention showing parts of the vehicle of which it forms a part.
Figure 2:
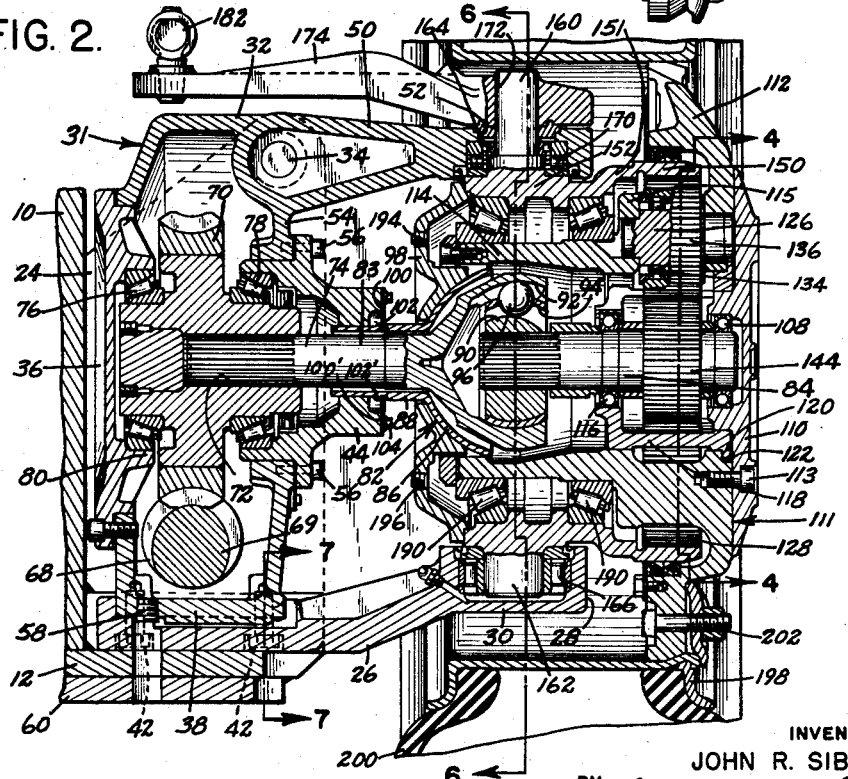
Fig. 2 is a generally vertical sectional view taken generally on the plane of line 2—2 on Fig. 1, however with the lower portion of the unit which it shows on a different plane angularly disposed a few degrees from the plane of line 2—2.
Figure 6:
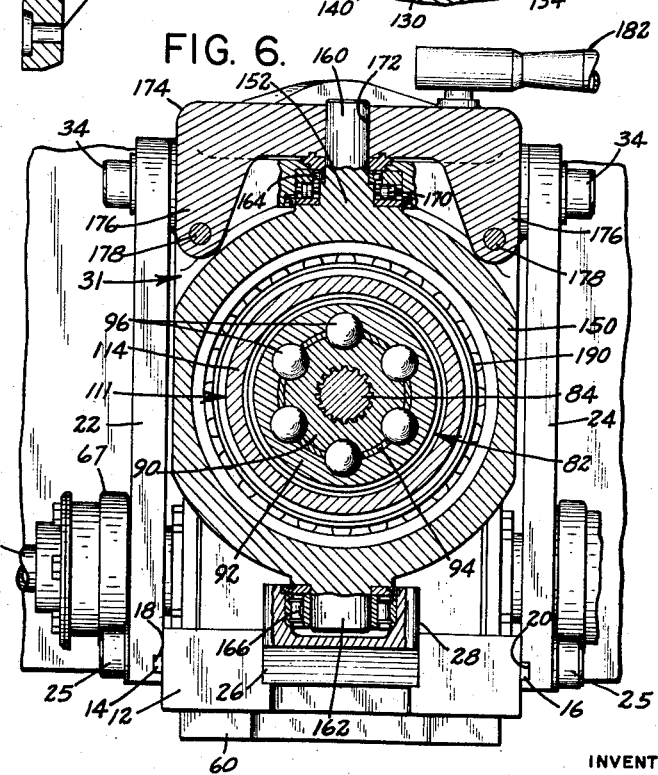
Fig. 6 is a vertical sectional view taken on the plane of line 6—6 on Fig. 2 with parts omitted.
Figure 7:
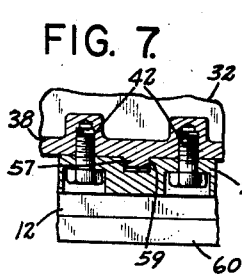
Fig. 7 is a fragmentary vertical sectional view taken on the plane of line 7—7 on Fig. 2.

Referring now more specifically to the drawings, although it will be understood that the wheel drive unit of the present invention may desirably be the same for each of the wheels of the shuttle car or like vehicle in which it is incorporated, the drive unit is shown only in connection with one of the wheels. There is shown in Figs. 1 and 2 a portion 10 of a vehicle to which is secured as by welding a lower supporting block 12. As seen best in Fig. 6, block 12 is provided with longitudinally extending transversely spaced ribs 14 and 16 which fit within longitudinally extending grooves 18 and 20 formed in a pair of upstanding side plates 22 and 24 respectively which abut the frame portion 10 of the vehicle at their inner ends. Side plates 22 and 24 are secured to block 12 at their lower ends by means of cap screws or the like 25. Block 12 has a portion cut away intermediate its ends for receiving a lower kingpin supporting arm 26, the outer end of which terminates in a generally cylindrical portion 28 having a closed bottom portion 30, as it were. A worm gear housing generally designated 31 lies adjacent the vehicle frame and includes a generally annular portion 32 secured adjacent its top to side plates 22 and 24 by means of threaded elements 34. A bearing cap or plate 36 is secured to portion 32 of gear housing 31 by means of threaded elements 40. Extending outwardly from portion 32 of the gear housing 31 adjacent the top thereof is a kingpin supporting arm 50 which is provided with a central aperture 52 adjacent its outer end. Arm 50 is formed adjacent its inner end with a depending flange 54 which abuts an outer bearing cap or plate member 44 and is secured thereto by means of threaded elements 56. A plug 58 is provided in the bottom wall 38 of gear housing portion 32 through which oils or greases used to lubricate the gearing to be presently described can be drained. Kingpin support arm 26 is secured to the lower wall 38 of the gear housing by means of threaded elements 42, and as shown best in Fig. 7, lower wall 38 has a depending longitudinally extending rib 57 which fits into a longitudinally extending channel 59 at the inner end of the kingpin arm, thus to prevent relative lateral movement between the lower kingpin support arm and the gear housing. A plate 60 which also is centrally apertured to provide easy access to the plug 58 is secured as by welding to block 12 to provide additional strength to the unit.

A drive shaft 66 which is connected to a motor, not shown, transmits drive through a suitable universal joint 67 to a worm 68 the shaft portion 69 of which is fixed to the universal joint. Worm gear 68 is positioned within gear housing 31 and meshes with a worm wheel 70 which is splined at 72 to a multiple sectioned driven shaft 74. Worm wheel 70 is journaled for free rotation by means of suitable thrust bearings 76 and 78, the latter bearings being supported between member 44 and the worm wheel, and bearings 76 between a forwardly extending annular portion 80 of the bearing cap 36 and the worm wheel 70.

As seen particularly in Fig. 2, the outer bearing cap or plate 44 of the gear housing is formed with a central aperture through which extends the driven shaft 74. Shaft 74 is made up of two separate shafts with the outer section 84 being secured for limited pivotal movement relative to the inward shaft section 83 by means of a so-called "rzeppa" joint indicated generally at 82. This joint comprises a housing 86 having an inwardly extending sleeve portion 88 encompassing shaft section 83, an inner race portion 90 splined to shaft section 84, an outer race portion 92 which is secured to the inward shaft section 83 and a bearing cage element 94 which fixes in place a series of circumferentially spaced ball bearings 96 between races 90 and 92. As noted in Fig. 2 sleeve 88 of the "rzeppa" joint housing is maintained in place between bearing housing plate 44 and a member 98, presently to be described, by means of a pair of diametrically opposed spring plates 100 and 100' abutting shoulders 102 and 102' respectively on sleeve 88 and being secured to member 44 by threaded elements 104. Shoulders 102 and 102' are formed by providing flat bottomed tangential grooves, as it were, in sleeve 88, with the radially inner rectilinear edges of the plates 100 and 100' contacting the flat bottoms of the respective grooves to lock sleeve 88 against rotation. The outer section 84 of the driven shaft 74 is suitably journaled by means of bearings 108 supported in a recessed portion of a hub cap 110 which is secured to the wheel hub portion 112 of a unitary hub, spindle and planet cage member designated generally 111 by means of threaded elements 113. Intermediate the "rzeppa" joint 82 and the hub cap 110 shaft section 84 is rotatably supported by means of bearings 116 which are in turn supported by an annular member 118 which is clamped between hub cap 110 and the wheel hub 112, the bearing supporting member 118 having an annular projection 120 and wheel hub 112 being recessed at 122 for this purpose.

Figure 3:
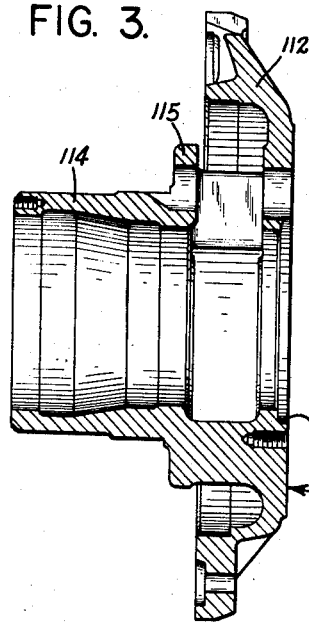
Fig. 3 is a view in section of the unitary hub, spindle and planet cage member according to the present invention.
Figure 4:
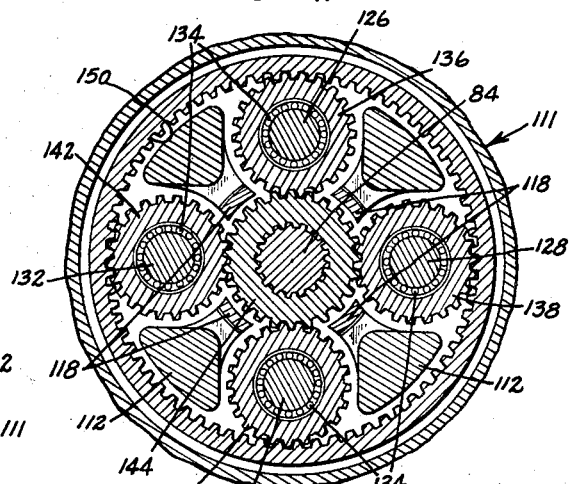
Fig. 4 is a vertical sectional view taken generally on the plane of line 4—4 on Fig. 2.

Looking now particularly at Fig. 3, it can be seen that the unitary hub, spindle, planet cage member 111 has a hollowed sleeve portion 114 extending inwardly from the wheel hub portion 112, portion 114 serving as a spindle with a planet cage portion 115 positioned between the hub and spindle portions. Secured between portions of the combined hub, cage and spindle member 111 are a plurality of stub shafts 126, 128, 130 and 132 (Fig. 4) on which are suitably mounted by means of ball bearings 134 planet gears 136, 138, 140 and 142 respectively. A sun gear 144 which is splined to the driven shaft section 84 meshes with the planet gears 136, 138, 140 and 142, while an internally toothed ring gear 150 encompasses and is in meshing engagement with the planet gears 136, 138, 140 and 142.

Referring again particularly to Fig. 2, it is seen that ring gear 150 forms a part of a unitary ring gear-kingpin member 151, with a portion 152, from which extend upper and lower kingpins designated 160 and 162 respectively, extending inwardly from the ring gear portion. Upper kingpin 160 extends through upper support arm 50 and is journaled therein by means of bearings 164 which transmit the transverse or lateral forces as will be commented on further at a later point herein from the ring gear-kingpin member to the supporting arm 50. For a like purpose lower kingpin 162 is suitably journaled by means of bearings 166 in the cylindrical portion 28 of the lower kingpin supporting arm 26. Vertical forces from the ring gear-kingpin member, as will also be further described presently, are transmitted to the upper kingpin support arm 50 through bearings 170 suitably mounted between the ring gear-kingpin member and the upper support arm.

Figure 5:
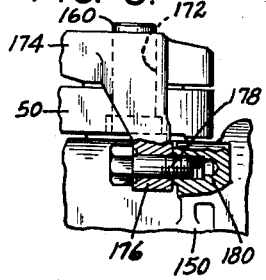
Fig. 5 is a fragmentary horizontal sectional view taken on the plane of line 5—5 on Fig. 1.

The upper kingpin 160 also extends upwardly through an aperture 172 in a horizontally extending arm 174 which forms a part of the steering mechanism. Arm 174 has depending therefrom side portions 176 which are secured by means of threaded elements 178 to ears or lugs 180 on the ring gear 150 (Fig. 5). A further link 182 is pivotally secured adjacent the end of arm 174 remote from kingpin 160, link 182 connecting arm 174 with other parts of a steering linkage, not shown, by which turning movement of the wheel the vehicle can be controlled.

Bearings 190 which are positioned on each side of a plane in which the turning axis of the wheel unit lies are suitably supported between spindle portion 114 of the unitary hub-spindle-gear cage member and the kingpin supporting portion 152 of the unitary ring gear-kingpin member to thus transmit loads or forces from the wheel hub to the kingpins, the horizontal component of which force, as aforementioned, is transmitted to the kingpin supporting arms 50 and 26 by bearings 164 and 166 respectively and the vertical component of which force is transmitted to kingpin support arm 50 through bearings 170. Member 98 which, as aforementioned, abuts the inward end of "rzeppa" joint housing 86 is secured to portion 152 of the ring gear-kingpin member by means of threaded elements 192 (Fig. 1). Plugs 194 and 196 are threaded into apertures in member 98 through which when the plugs are removed lubricating oils can be supplied.

As is noted in Fig. 2 a wheel rim 198 to which a tire 200 is fixed is secured to the wheel hub 112 by means of bolt and nut assemblies 202. In the actual operation of the unit, power is taken from the drive shaft 66 and transmitted through the worm 68 and the worm wheel 70 to the shaft 74. The rotation of the shaft 74 and particularly the outer section 84 thereof results in the rotation of the planet gears and the spindle-gear cage-wheel hub member relative to the ring gear-kingpin member about the axis of shaft 84. The wheel is steered as aforementioned by means of the linkage 182 and 174 with turning movement of course taking place about the common axis of kingpins 160 and 162.

It can be seen from the foregoing description read in conjunction with the drawings that the spindle bearings are supported wholly within, rather than outside, the ring gear member and due to the unitary ring gear and kingpin member the stresses and torque from the ring gear and those transmitted to the kingpins from the wheel hub are in turn transmitted directly from the kingpins to the supporting frame members. Due to the elimination of the longitudinal length of ring gear supporting web which has heretofore been necessary, the overall length of the unit is reduced, with a result that due to the shorter lever arm, as it were, there is realized a reduction in moment.

While there is in this application specifically described one form which the invention may assume in practice, it will be understood that this form of the same is shown for purposes of illustration and that the invention may be modified and embodied in various other forms without departing from its spirit or the scope of the appended claims.

What I claim is:

1. In combination, a support having alined bearings for coaxial kingpins, a member having a ring gear in fixed relation thereto and mutually coaxially spaced kingpins, a wheel having secured thereto a planet gear carrier with which it is coaxial, said wheel having a hub and a coaxial hollow spindle projecting inwardly beyond said kingpins, said hub, planet gear carrier and hollow spindle comprising a unitary member, a drive shaft having a universal driving joint therein between the adjacent ends of said kingpins and having a sun gear driven thereby, planet gears meshing with said sun and ring gears and rotatably mounted on axes fixed with respect to said wheel and means for mounting said unitary member for rotation relative to said first mentioned member including bearings some of which lie on each side of a central vertical plane through said kingpins and non-parallel with respect to the longitudinal axes of said drive shaft and all of which bearings lie nearer such a plane than the outer extremity of said wheel.

2. In combination, a support, a wheel mounted for turning about a generally vertical axis relative to said support, a planet gear carrier in fixed relation to and coaxial with said wheel, a hollow spindle in fixed relation to and coaxial with said wheel and said planet gear carrier, said spindle projecting inwardly beyond said turning axis, a drive shaft having a universal driving joint therein coplanar with said turning axis and having a sun gear driven thereby, an annular member extending on each side of said axis and surrounding said spindle, a ring gear fixed with respect to said latter member, planet gears journaled on said carrier and meshing with said sun and ring gears and rotatably mounted on axes fixed with respect to said wheel and spindle, means for mounting said spindle for rotation relative to said annular member and ring gear including bearing means comprising a bearing between said annular member and said spindle, said bearing lying inboard of said gears and nearer said turning axis than the outer extremity of said wheel and said axis of turning movement of said wheel lying in a plane disposed between said bearing and said gearing.

3. In combination, a support, a wheel mounted for turning about a generally vertical axis relative to said support, a planet gear carrier in fixed relation to and coaxial with said wheel, a hollow spindle in fixed relation to and coaxial with said wheel and said planet gear carrier, said spindle projecting inwardly beyond said turning axis, a drive shaft having a universal driving joint therein coplanar with said turning axis and having a sun gear driven thereby, at least one kingpin coaxial with said turning axis, a ring gear fixed with respect to said kingpin, planet gears meshing with said sun and ring gears and rotatably mounted on axes fixed with respect to said wheel, and means for mounting said spindle for rotation relative to said ring gear including bearings some of which lie on each side of said axis and all of which bearings lie nearer such axis than the outer extremity of said wheel.

4. In combination, a support, a wheel mounted for turning about a generally vertical axis relative to said support, a planet gear carrier and a ring gear coaxial with said wheel, said gear carrier fixed with respect to said wheel, a hollow tubular member in fixed relation to said gear carrier and coaxial with said wheel, said hollow tubular member projecting inwardly beyond said turning axis, a drive shaft having a universal driving joint therein the generally vertical axis of which is coplanar with said turning axis and having a sun gear driven thereby, planet gears carried by said planet gear carrier and meshing with said sun and ring gears to provide rotational movement between said ring gear and said planet gear carrier, and means for mounting the rotatable hollow tubular member for rotation including bearings some of which lie on each side of said axis and all of which bearings lie nearer such axis than the outer extremity of said wheel.

5. In combination, a support, a wheel mounted for turning about a generally vertical axis relative to said support, a planet gear carrier and a ring gear coaxial with said wheel, said gear carrier fixed with respect to said wheel, a hollow tubular member in fixed relation to said gear carrier and coaxial with said wheel, said hollow tubular member projecting inwardly beyond said turning axis, a drive shaft having a universal driving joint therein the generally vertical axis of which is coplanar with said turning axis and having a sun gear driven thereby, planet gears carried by said planet gear carrier and meshing with said sun and ring gears to provide rotational movement between said ring gear and said planet gear carrier, a member extending inwardly beyond said turning axis and being fixed with respect to said ring gear, and means for mounting the hollow tubular member for rotation relative to said ring gear including bearings some of which lie on each side of said axis and all of which bearings lie nearer such axis than the outer extremity of said wheel.

References Cited in the file of this patent

UNITED STATES PATENTS

| | | |
|---|---|---|
| 1,193,560 | Kerlin | Aug. 8, 1916 |
| 1,437,800 | Garver | Dec. 5, 1922 |
| 2,659,246 | Norelius | Nov. 17, 1953 |

FOREIGN PATENTS

| | | |
|---|---|---|
| 973,268 | France | Sept. 13, 1950 |
| 1,068,378 | France | Feb. 3, 1954 |
| 1,103,608 | France | May 25, 1955 |

(U. S. corresponding 2,801,702—Aug. 6, 1957)